Dec. 29, 1964   A. L. HORNE ETAL   3,162,929
MILLING CUTTERS
Filed May 21, 1963

United States Patent Office 3,162,929
Patented Dec. 29, 1964

3,162,929
MILLING CUTTERS
Arthur Leonard Horne, Streetly, and Clifford Douglas Johnson, Tenbury Wells, England, assignors to Richard Lloyd Limited, Tyburn, Birmingham, England, a British company
Filed May 21, 1963, Ser. No. 281,996
Claims priority, application Great Britain May 29, 1962
4 Claims. (Cl. 29—105)

This invention relates to milling cutters of the kind comprising a circular body the peripheral portion of which is formed with transverse slots receiving insertable and removable means for supporting and positioning a readily-removable throw-away or expendible cutter tip.

According to the invention, a milling cutter comprises a circular body having transverse slots in its peripheral portion, in combination with a slidable tip-locating bar or strip disposed in each slot adjacent one side thereof, a main wedge disposed between said bar or strip and the other side of the slot, screw means for operating the said main wedge to fix the bar or strip in position, a throw-away or expendible cutter tip disposed adjacent a face of said main wedge and engaged by an end of the tip-locating bar or strip, and an auxiliary wedge disposed in the slot and being operable upon the cutter tip to clamp the same against a face of the main wedge.

FIGURE 1 of the accompanying drawing is a front elevation of a portion of a milling cutter in accordance with the present invention.

Figure 1:
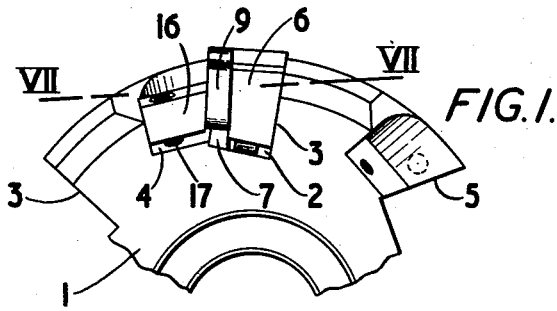
Figure 2:
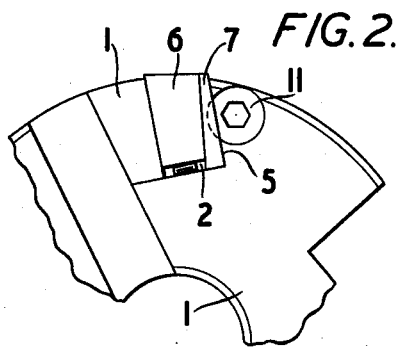
FIGURE 2 is a rear elevation of a portion of said milling cutter.
Figure 3:
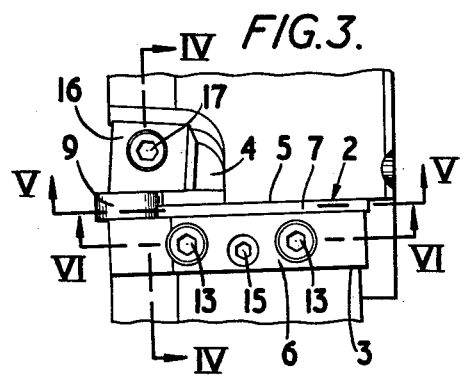
FIGURE 3 is a fragmentary plan view of the cutter showing the means for supporting and locating one of the throw-away cutter tips.
Figure 4:
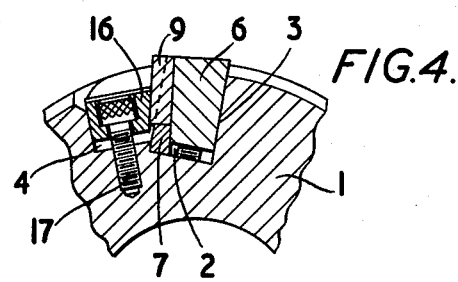
FIGURE 4 is a cross-section taken on line IV—IV, FIGURE 3.

Referring to the said drawing, the milling cutter therein illustrated consists of a circular body 1, adapted for rotation, and having around its periphery a series of transverse slots 2 spaced apart equally in a circumferential direction and being adapted to receive the cutter blade positioning means.

Each slot 2 in the body has one lateral plane face 3 extending continuously from the back to front of the body at a suitable angle to the front and back faces of the body to give the desired rake angle to the cutter, and having a suitable inclination transversely. The opposite side of the slot, however, is recessed towards the front face of the body, at 4, to give a wide front end to the slot the narrower rear portion of the said slot having a side wall 5, rearwards of the recess, which in plan view, is parallel to the continuous side face 3 which is opposed to it.

Figure 5:
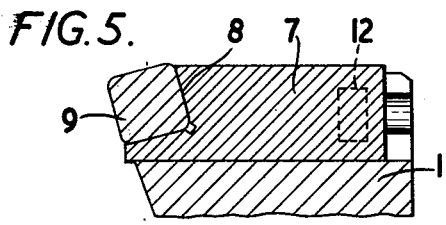
FIGURE 5 is a radial section taken on line V—V, FIGURE 3.
Figure 7:
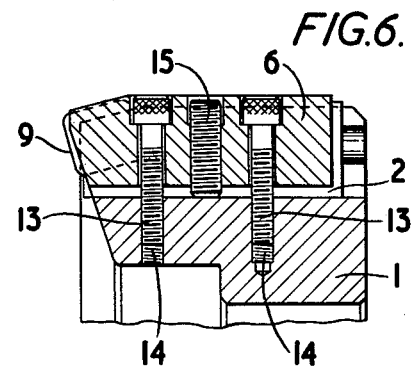
FIGURE 7 is a horizontal section taken on line VII—VII, FIGURE 1.

Inserted in the slot, and located against the continuous side face 3 thereof, is a main wedge member 6, and between this main wedge member 6 and the opposite face 5 of the slot in the body, is a tip-locating bar or strip 7, of wedge-shape in cross-section, having its forward end shaped with a right-angled notch 8 (FIG. 5) to engage two edges of a corner of a square-shaped throw-away cutter tip 9 having cutting edges on all sides, one or other of which can be brought into use, as required. This cutter tip 9 is placed in position in the notch 8 and the locating bar or strip 7 is adjusted longitudinally to set the tip with its cutting edge in its desired position in relation to the main wedge 6 and cutter body 1. This adjustment is effected by means of a screw 10 inserted into a tapped hole in the rear face of the cutter body and having a head 11 which engages a recess 12 in the side of the locating bar (see FIGURE 7), so that by rotating the screw a positive longitudinal adjustment of the bar can be obtained both forwards and backwards.

Figure 6:
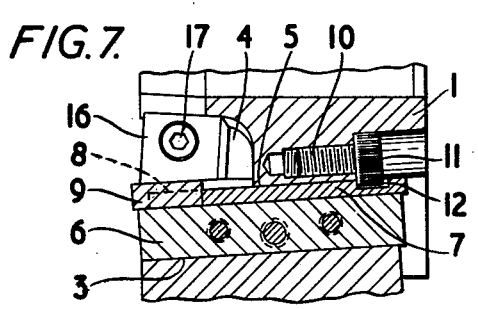
FIGURE 6 is a section taken on line VI—VI, FIGURE 3.

In order to lock the locating bar 7 in its adjusted position, the main wedge 6 is operated and forced radially inwards by means of two screws 13, 13, passing through the wedge and into tapped holes 14, 14 (FIGURE 6) in the base of the slot 2, the bar 7 being thereby clamped against the one side face 5 of the said slot. An extracting screw 15 is provided between the two screws 13 so that it may bear upon the bottom of the slot in order to raise the wedge after the wedging screws 13 have been slackened. The loose cutter tip 9 is clamped against the side face of the main wedge 6 by means of an auxiliary wedge 16 which is inserted in the recess 4 at the front of the body slot, between the said tip 9 and a face of the recess, being forced radially inwards by means of a screw 17 engaging a tapped hole in the bottom of said recess, so that an inclined side face of the wedge will operate on a side face of the tip 9. The front nose end of the main wedge 6 is of V-shape, to correspond with the outwardly-presented corner of the adjacent cutter tip, as will be seen from FIGURE 6.

We claim:

1. A milling cutter comprising a circular body having transverse slots in its peripheral portion, in combination with a slidable tip-locating bar disposed in each slot adjacent one side thereof, a main wedge disposed between said bar and the other side of the slot, screw means for operating the said main wedge to fix the bar in position, a throw-away or expendible cutter tip disposed adjacent a face of said main wedge and engaged by an end of the tip-locating bar, and an auxiliary wedge disposed in the slot and being operable upon the cutter tip to clamp the same against a face of the main wedge.

2. A milling cutter as claimed in claim 1, wherein the tip-locating bar has in its outer end a notch receiving a corner portion of a square-shaped throw-away cutter tip.

3. A milling cutter as claimed in claim 1, wherein the tip-locating bar is adjustable longitudinally by means of a screw engaging a tapped hole in the cutter body and having a head engaging a recess in the side of the said locating bar.

4. A milling cutter as claimed in claim 1, wherein each slot in the cutter body is formed with a lateral enlargement at one end in which the auxiliary wedge is located so as to engage a face of the cutter tip, and a screw is provided for forcing said auxiliary wedge radially inwards so that an inclined face of said wedge will exert a lateral force on said cutter tip to cause the latter to be clamped against a side face of the main wedge.

No references cited.